(12) United States Patent
Kondo et al.

(10) Patent No.: US 8,002,866 B2
(45) Date of Patent: Aug. 23, 2011

(54) STEAM-WATER SEPARATOR

(75) Inventors: Yoshiyuki Kondo, Hyogo (JP);
Tadahiko Suzuta, Hyogo (JP);
Toshiyuki Mizutani, Hyogo (JP);
Yasuhiko Hirao, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 294 days.

(21) Appl. No.: 12/281,410

(22) PCT Filed: Mar. 1, 2007

(86) PCT No.: PCT/JP2007/053915
§ 371 (c)(1),
(2), (4) Date: Sep. 2, 2008

(87) PCT Pub. No.: WO2007/100041
PCT Pub. Date: Sep. 7, 2007

(65) Prior Publication Data
US 2009/0007530 A1    Jan. 8, 2009

(30) Foreign Application Priority Data
Mar. 2, 2006   (JP) .................................. 2006-056576

(51) Int. Cl.
*B04C 3/00* (2006.01)
(52) U.S. Cl. ............ 55/457; 55/447; 55/456; 55/396; 55/394; 55/398; 55/399; 55/392; 137/171
(58) Field of Classification Search .............. 55/457, 55/447, 456, 396, 394, 398, 399, 392; 137/171
See application file for complete search history.

(56) References Cited

U.S. PATENT DOCUMENTS

| 2,648,397 | A | * | 8/1953 | Ravese et al. ................ 55/343 |
| 3,329,130 | A | | 7/1967 | Cochran |
| 3,755,996 | A | | 9/1973 | Klein et al. |
| 3,769,781 | A | * | 11/1973 | Klein et al. ................ 96/372 |
| 3,961,923 | A | | 6/1976 | Rouhani |

(Continued)

FOREIGN PATENT DOCUMENTS

DE    1526968 B1    11/1970

(Continued)

OTHER PUBLICATIONS

International Search Report of PCT/JP2007/053915, date of mailing Apr. 3, 2007.

(Continued)

*Primary Examiner* — Jason M Greene
*Assistant Examiner* — Dung Bui
(74) *Attorney, Agent, or Firm* — Westerman, Hattori, Daniels & Adrian, LLP

(57) ABSTRACT

In a steam-water separator, a swirl vane (52) is provided inside a riser (51), an annular downcomer space (54) is formed by providing a downcomer barrel (53) outside the riser (51), a deck plate (55) is arranged above the riser (51) and the downcomer barrel (53) with a predetermined space therefrom, an orifice (56) and vents (57) are formed, and aperture ratios of plural slits (58*a*, 58*b*, 58*c*, and 58*d*) formed on the riser (51) are set at from 30% to 70%. Accordingly, the steam and the water is appropriately separated, and the separated steam is reliably discharged upward from the orifice while the separated water is allowed to reliably flow down through the downcomer space, thereby enhancing steam-water separating efficiency.

9 Claims, 10 Drawing Sheets

U.S. PATENT DOCUMENTS

| | | | | |
|---|---|---|---|---|
| 4,015,960 | A * | 4/1977 | Nutter | 55/355 |
| 4,238,210 | A * | 12/1980 | Regehr et al. | 55/396 |
| 4,349,360 | A * | 9/1982 | Schuurmans et al. | 96/311 |
| 4,629,481 | A * | 12/1986 | Echols | 55/348 |
| 6,190,438 | B1 * | 2/2001 | Parks | 95/269 |
| 6,468,321 | B2 * | 10/2002 | Kinsel | 55/457 |
| 7,144,437 | B2 * | 12/2006 | Christiansen et al. | 55/343 |
| 7,258,727 | B2 * | 8/2007 | Greif et al. | 95/269 |
| 7,503,950 | B2 * | 3/2009 | Håland | 55/315 |
| 7,691,185 | B2 * | 4/2010 | Darke et al. | 95/269 |
| 2008/0271421 | A1 * | 11/2008 | Darke et al. | 55/396 |
| 2009/0120297 | A1 * | 5/2009 | Suzuta et al. | 96/191 |

FOREIGN PATENT DOCUMENTS

| | | | |
|---|---|---|---|
| DE | 2051180 | A1 | 4/1972 |
| JP | 49-64972 | A | 6/1974 |
| JP | 50-38866 | A | 4/1975 |
| JP | 5-346483 | A | 12/1993 |
| JP | 6-509982 | A | 11/1994 |
| JP | 2001-79323 | A | 3/2001 |
| JP | 2001-079323 | A | 3/2001 |
| JP | 2002-143620 | A | 5/2002 |
| JP | 2003-329793 | A | 11/2003 |
| RU | 2206023 | C2 | 6/2003 |
| RU | 2253796 | C2 | 6/2005 |
| SU | 767452 | A1 | 9/1980 |
| SU | 890015 | A1 | 12/1984 |
| WO | 93/05339 | A1 | 3/1993 |

OTHER PUBLICATIONS

Russian Office Action dated Sep. 18, 2009, issued in corresponding Russian Patent Application No. 2008139086/06(050386).

Taiwanese Office Action dated Dec. 8, 2009, issued in corresponding Taiwanese Patent Application No. 096107265.

* cited by examiner

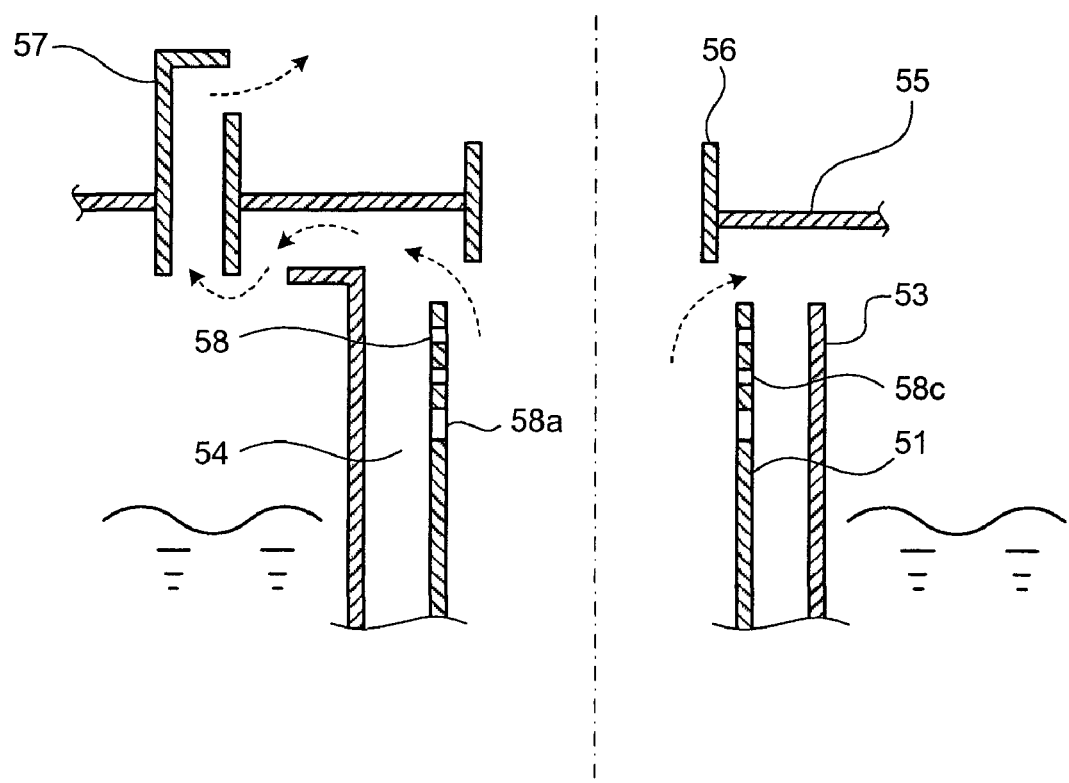

STEAM-WATER SEPARATOR

TECHNICAL FIELD

The present invention relates to a steam-water separator that separates a two-phase flow of steam and liquid into the steam and the liquid.

BACKGROUND ART

For example, a pressurized water reactor (PWR: Pressurized Water Reactor), using light water as a reactor coolant and a neutron moderator, runs it as non-boiling, high-temperature and high-pressure water throughout a reactor core, sends the high-temperature and high-pressure water to a steam generator for generation of steam by heat exchange, and sends the steam to a turbine generator for generation of electricity. The pressurized water reactor transfers the heat of high-temperature and high-pressure primary cooling water to secondary cooling water by way of the steam generator, generating the steam from the secondary cooling water. In the steam generator, the primary cooling water flows inside a large number of narrow heat-transfer tubes, and the heat of the primary cooling water is transferred to the secondary cooling water flowing outside the heat-transfer tubes, thereby generating the steam, which causes the turbine to rotate for generating electricity.

In the steam generator, a tube bank external cylinder is arranged inside the sealed hollow barrel with a predetermined space from the inner wall thereof, a plurality of heat-transfer tubes of an inverted U shape are arranged inside the tube bank external cylinder, with each heat-transfer tube having its end supported by a tube plate and its middle part supported by a plurality of tube supporting plates that are supported by stay-rods extending from the tube plate, and a steam-water separator and a humidity separator are arranged in the upper part.

Therefore, when the primary cooling water is supplied to the plurality of heat-transfer tubes through a water chamber provided at the lower part of the barrel, and the secondary cooling water is supplied into the barrel from a water supply pipe provided at the upper part of the barrel, the heat exchange is performed between the primary cooling water (hot water) flowing inside the plurality of heat-transfer tubes and the secondary cooling water (cold water) circulating inside the barrel, so that the secondary cooling water absorbs the heat and the steam is generated. When the steam goes upward, the water is separated from the steam, and the steam is discharged from the upper end of the barrel while the water falls downward.

A conventional steam-water separator consists of a plurality of risers through which the steam goes upward, a swirl vane provided inside the riser, a downcomer barrel located outside the riser to form a downcomer space, and a deck plate having an orifice and a vent that is arranged opposite the upper end of the riser and the downcomer barrel with a predetermined space therefrom.

Therefore, two-phase flow of the steam and the water generated by the steam generator is introduced into each riser at its lower end, moving upward, and is lifted upward while whirling by the swirl vane, and the water deposits on the inner wall face of the riser and moves upward while becoming a liquid film flow and the steam moves upward while whirling at the upper part of the riser. The steam is delivered above the deck plate mainly through the orifice and the vent, and the water escapes out of the riser through an opening between the upper end of the riser and the deck plate, flowing into the downcomer barrel and then flows downward. Accordingly, only the steam flows out above the deck plate.

This type of steam-water separator is described in the Patent Documents 1 and 2 below.

In the conventional steam-water separator, most of the water flowing out of the riser from the upper end thereof into the downcomer barrel flows down through the downcomer barrel. However, some of the water escapes out of the downcomer barrel from the top thereof, and comes to flow out of the vent above the deck plate, being accompanied by the steam moving upwards outside the downcomer barrel, which decreases steam-water separating efficiency.

Therefore, in a steam-water separator as described in Patent Document 3 below, a swirl vane that swirls and lifts a mixture of water and steam is provided in the riser, and slits are formed below an upper opening of the riser and above the swirl vane. Thus, while being swirled and lifted in the riser by the swirl vane, the mixture is separated into a second mixture whose primary element is the water and a third mixture whose primary element is the steam. When the second mixture is lifted up to the height of the slits while being swirled, the second mixture is discharged through the slits into the downcomer barrel.

Patent Document 1: Japanese Patent Application Laid-Open No. S49-064972

Patent Document 2: Japanese Patent Application Laid-Open No. H05-346483

Patent Document 3: Japanese Patent Application Laid-Open No. 2001-079323

DISCLOSURE OF INVENTION

Problem to be Solved by the Invention

In the steam-water separator as described in Patent Document 3 mentioned above, a carryunder phenomenon of the water following out of the downcomer barrel from the top can be restrained to some extent by forming the slits at the upper end of the riser and discharging the second mixture whose primary element is the water through the slits into the downcomer barrel. However, it is difficult to completely eliminate the carryunder phenomenon.

The present invention is intended to solve the problems mentioned above, and an object of the present invention is to provide a steam-water separator aimed at enhancing steam-water separating efficiency by appropriately separating the steam and the water and reliably discharging the separated steam upwards from an orifice while allowing the separated water to reliably fall down through the downcomer space.

Means for Solving Problem

According to an aspect of the present invention, a steam-water separator comprises a steam-water riser pipe that includes a plurality of openings on a wall surface at an upper end thereof and through which a two-phase flow of water and steam goes up; a swirl vane provided inside the steam-water riser pipe; a downcomer barrel which is disposed around the steam-water riser pipe to form an annular downcomer space; and a deck plate which is disposed on upper ends of the steam-water riser pipe and the downcomer barrel with a predetermined space therefrom such that the deck plate faces to the steam-water riser pipe and the downcomer barrel. The deck plate includes an orifice arranged above the steam-water riser pipe. An aperture ratio of the plural openings formed on the steam-water riser pipe is set at from 30% to 70%.

In the steam-water separator, the plurality of openings formed on the steam-water riser pipe may include a plurality of horizontal slits arranged in parallel along a vertical direction, and a height of each of the slits is set at from half to twice a thickness of the steam-water riser pipe.

In the steam-water separator, a distance between the plurality of openings formed on the steam-water riser pipe and the swirl vane may be set at from 1 to 2.5 times an internal diameter of the steam-water riser pipe.

In the steam-water separator, two guide units that discharge swirling flow of the steam may be provided on a wall surface at an upper end of the downcomer barrel, the guide units are equally spaced in a circumferential direction thereof, and four openings may be provided on the steam-water riser pipe with equally spaced in a circumferential direction of the steam-water riser pipe, and two of the four openings are located opposite the guide units.

In the steam-water separator, vents may be provided on the deck plate downstream of the swirling flow of the steam discharged from the guide units.

In the steam-water separator, a twist angle of the swirl vane may be set at from 15 degrees to 30 degrees.

In the steam-water separator, a ratio of an internal diameter of the orifice with respect to an internal diameter of the steam-water riser pipe may be set at from 0.7 to 0.9.

In the steam-water separator, a ratio of a spatial height from the steam-water riser pipe to the deck plate with respect to an internal diameter of the steam-water riser pipe may be set at from 0.05 to 0.3.

In the steam-water separator, a ratio between an upward projection height and a downward projection height of the orifice relative to the deck plate may be set at from 2:1 to 4:1, and a ratio between the upward projection height and an internal diameter of the orifice may be set at from 1:2 to 1:3.

Effect of the Invention

According to the steam-water separator of the present invention, the steam-water riser pipe that has a plurality of the openings on its wall surface at the upper end and through which a two-phase flow of the water and the steam goes up is provided, the swirl vane is provided inside the steam-water riser pipe, the downcomer barrel is provided surrounding the steam-water riser pipe to form the annular downcomer space, the deck plate that is arranged opposite the upper ends of the steam-water riser pipe and the downcomer barrel with the predetermined space therefrom and that includes the orifice arranged above the steam-water pipe is provided, and the aperture ratios of the plural openings formed on the steam-water riser pipe are set at from 30% to 70%. Therefore, the two-phase flow of the water and the steam that is introduced into the steam-water riser pipe from its lower end goes upward and then is lifted while being swirled by the swirl vane, and the water deposits on the inner face of the steam-water riser pipe and is lifted while becoming a liquid film flow. At this moment, because the aperture ratios of the plural openings formed on the wall surface of the steam-water riser pipe at the upper end are set at from 30% to 70%, the water appropriately flows into the downcomer space of the downcomer barrel and falls down without being carried over from the orifice or carried under to outside the downcomer barrel. On the other hand, the steam flows upward while being swirled at the upper part of the steam-water riser pipe, and is appropriately discharged above the deck plate through the orifice without absorbing the water. As a result, the steam-water separating efficiency is enhanced.

According to the steam-water separator of the present invention, the openings formed on the steam-water riser pipe are plural horizontal slits arranged in parallel along the vertical direction, and the heights of the slits are set at from half to twice the thickness of the steam-water riser pipe. Therefore, it is possible to prevent the steam from flowing into the slits, and cause only the water to appropriately flow into the downcomer space through these slits.

According to the steam-water separator of the present invention, the distance between the openings formed on the steam-water riser pipe and the swirl vane is set at from 1 time to 2.5 times the internal diameter of the steam-water riser pipe. Therefore, the two-phase flow of the water and the steam is lifted while being swirled by the swirl vane so that, after being separated into the water and the steam, the water appropriately flows into the downcomer space while the steam is appropriately discharged through the orifice, which enhances the steam-water separating efficiency.

According to the steam-water separator of the present invention, the two guide units that discharge swirling flows of the steam are provided on the wall surface at the upper end of the downcomer barrel, equally spaced in the circumferential direction, and four openings are provided on the steam-water riser pipe, equally spaced in the circumferential direction of the steam-water riser pipe, and two of the four openings are located opposite the guide units. Therefore, the water separated by being lifted and swirled by the swirl vane passes through the slits, and flows to outside the downcomer barrel through the guide units together with the steam. Accordingly, the water and the steam can be processed with appropriately separated each other.

According to the steam-water separator of the present invention, the vents are provided on the deck plate downstream of the swirling flows of the steam discharged from the guide units. Therefore, the steam discharged outward from the downcomer barrel through the guide units can be appropriately discharged through the vents above the deck plate.

According to the steam-water separator of the present invention, the twist angle of the swirl vane is set at from 15 degrees to 30 degrees. Therefore, by applying an appropriate whirling power to the two-phase flow by ways of the swirl vane, the water and the steam can be reliably separated.

According to the steam-water separator of the present invention, the ratio of the internal diameter of the orifice with respect to the internal diameter of the steam-water riser pipe is set at from 0.7 to 0.9. Therefore, only the steam can be discharged through the orifice above the deck plate without the separated water being carried over from the orifice.

According to the steam-water separator of the present invention, the ratio of the spatial height from the steam-water riser pipe to the deck plate with respect to the internal diameter of the steam-water riser pipe is set at from 0.05 to 0.3. Therefore, the separated water can be appropriately flowed into the downcomer space without the water being carried over from the orifice and with the discharge of the steam from the space being restrained.

According to the steam-water separator of the present invention, the ratio between the upward projection height and the downward projection height of the orifice relative to the deck plate is set at from 2:1 to 4:1, and the ratio between the upward projection height and the internal diameter of the orifice is set at from 1:2 to 1:3. Therefore, it is possible to prevent carryover of the separated water from the orifice and prevent carryunder of the water toward outside the downcomer barrel.

BRIEF DESCRIPTION OF DRAWINGS

FIG. 7 is a cross section of an upper part of the steam-water separator of the embodiment.

Figure 1:
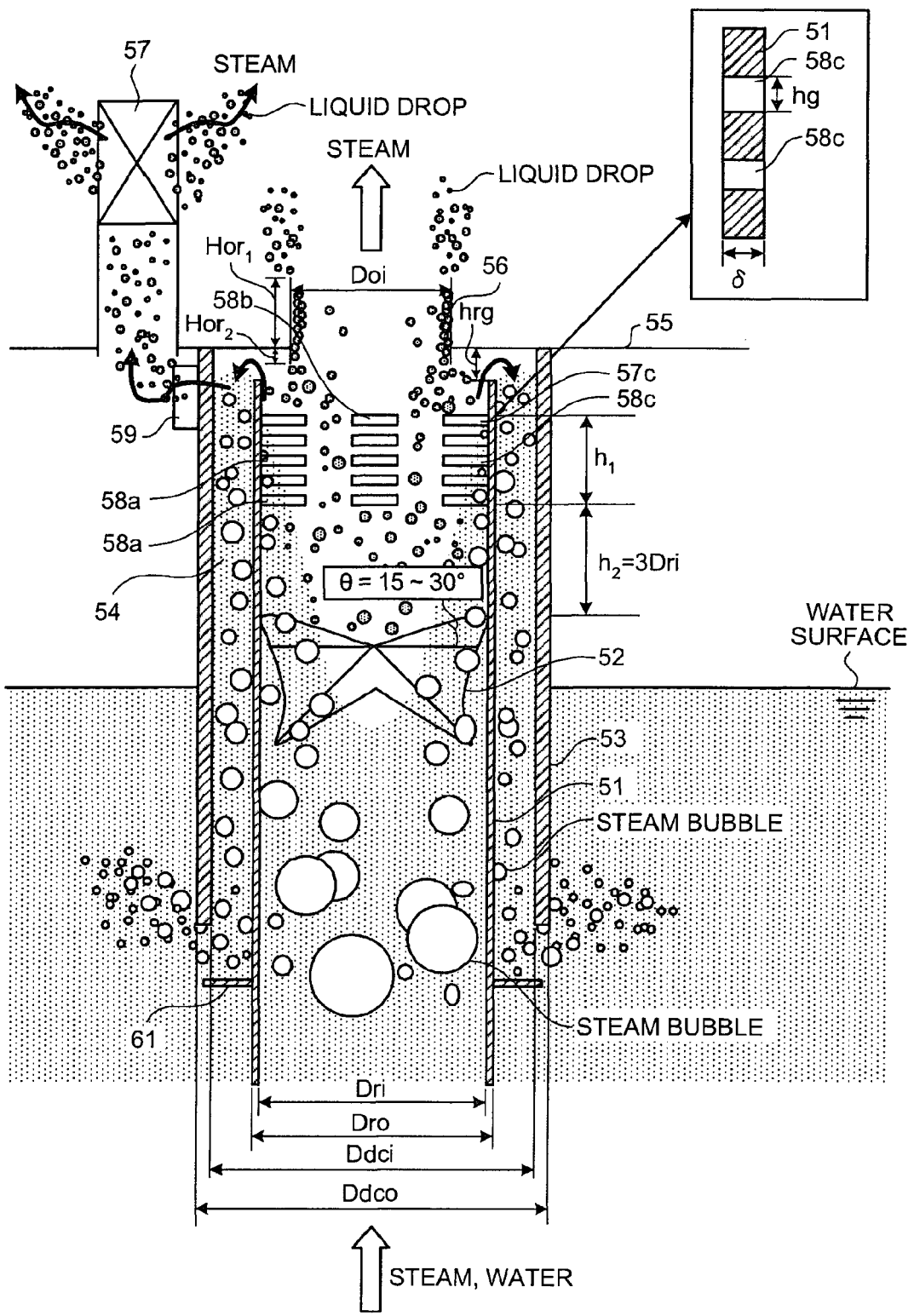
FIG. 1 is a schematic diagram of relevant parts of a steam-water separator according to an embodiment of the present invention.

EXPLANATIONS OF LETTERS OR NUMERALS 13 steam generator
31 barrel
32 tube bank external cylinder
37 heat-transfer tube
38 heat-transfer tube group
45 steam-water separator
46 moisture separator
47 water supply pipe
51 riser (steam-water riser pipe)
52, 60 swirl vane
53 downcomer barrel (water downcomer barrel)
54 downcomer space
55 deck plate
56 orifice
57 vent
58a, 58b, 58c, 59d slit (opening)
59 guide unit
61 restraint plate

BEST MODE(S) FOR CARRYING OUT THE INVENTION

In the following, exemplary embodiments of a steam-water separator according to the present invention are explained in detail with reference to accompanying drawings. The present invention is not to be limited by these embodiments.

Embodiments

Figure 2:
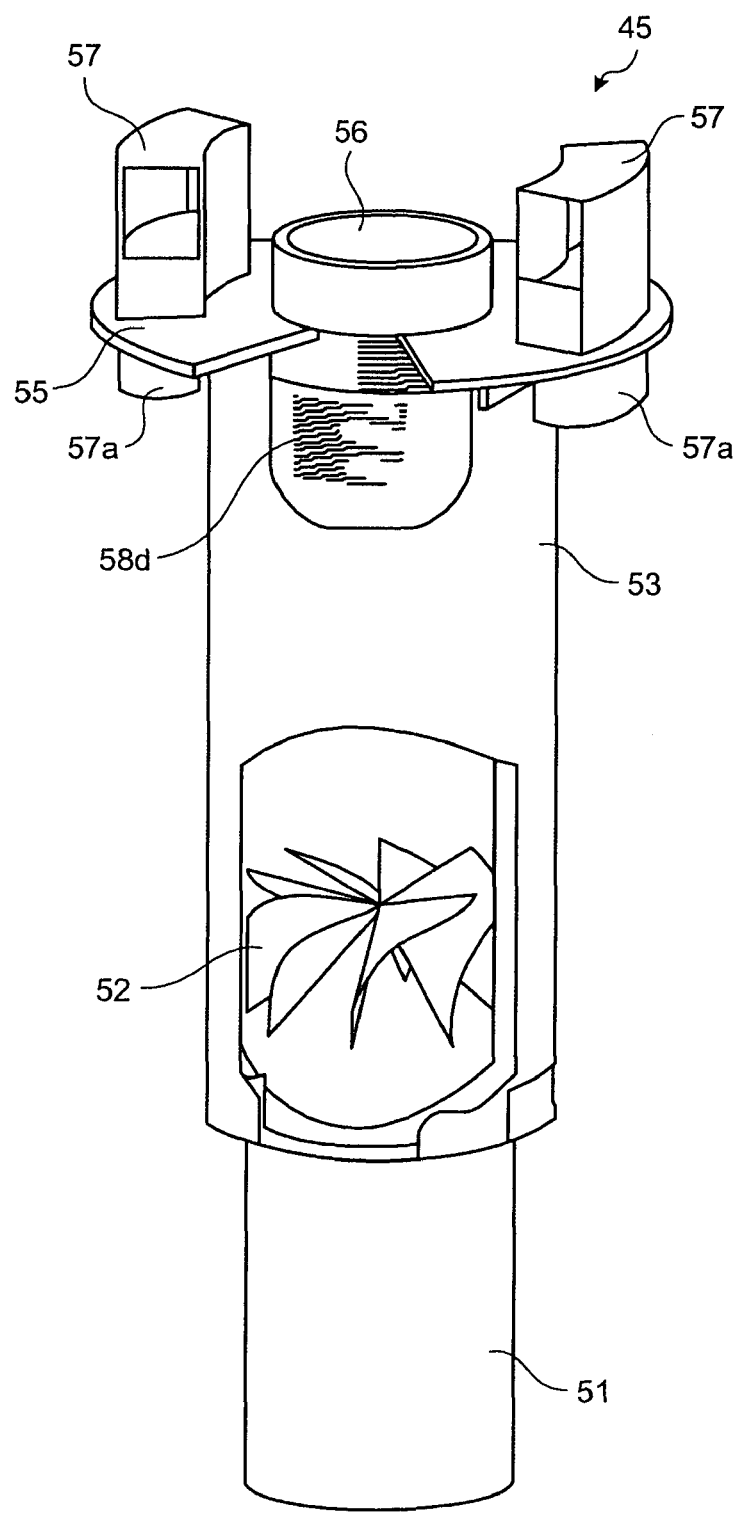
FIG. 2 is a partly-broken perspective view of a steam-water separator according to the embodiment.
Figure 3:
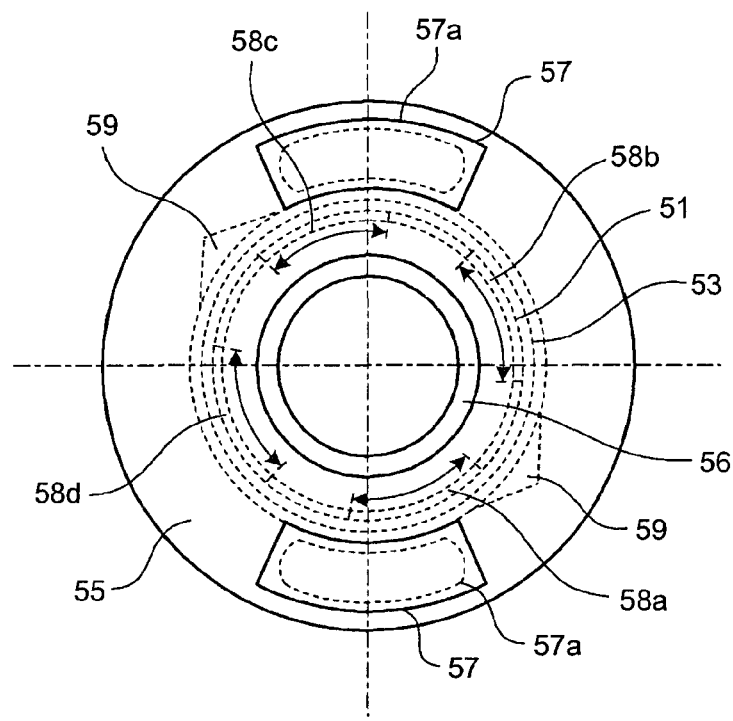
FIG. 3 is a plan view of the steam-water separator according to the embodiment.
Figure 4:
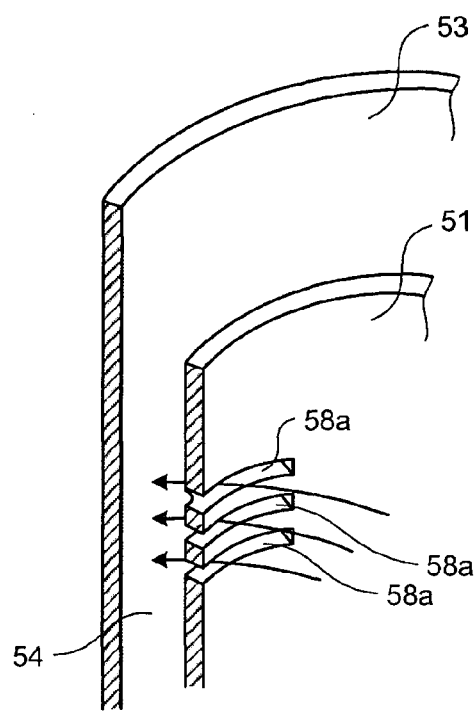
FIG. 4 is a schematic diagram of slits formed on a riser.
Figure 5:
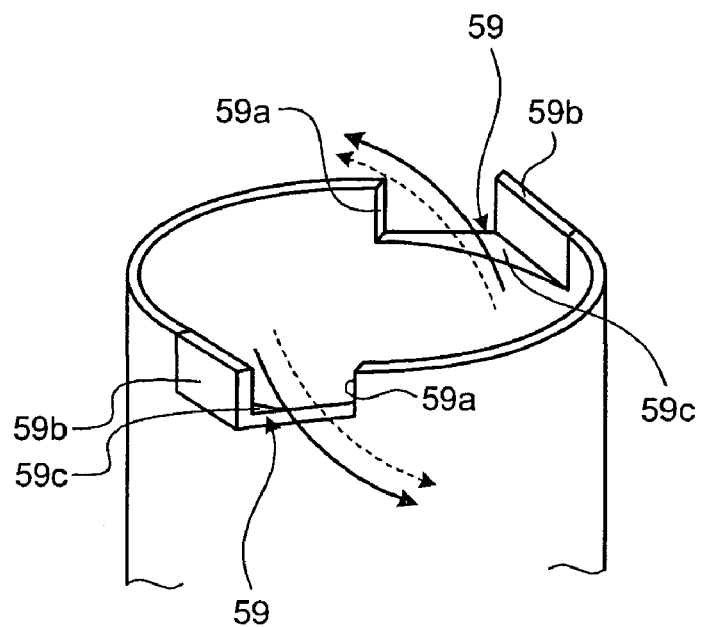
FIG. 5 is a schematic diagram of guide units provided on the riser.
Figure 6:
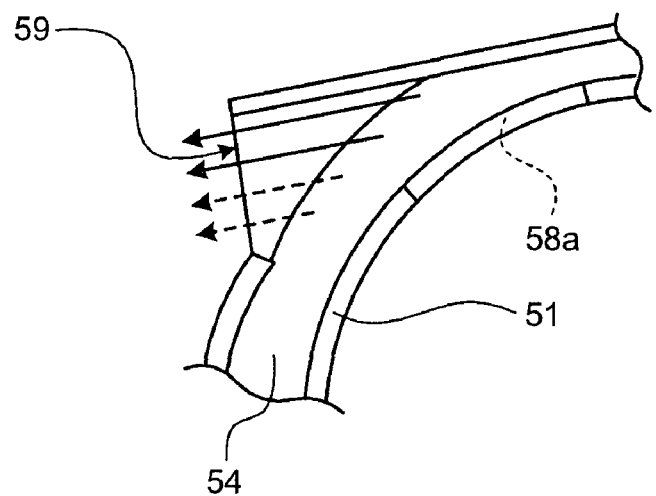
FIG. 6 is a plan view of the guide unit.
Figure 8A:
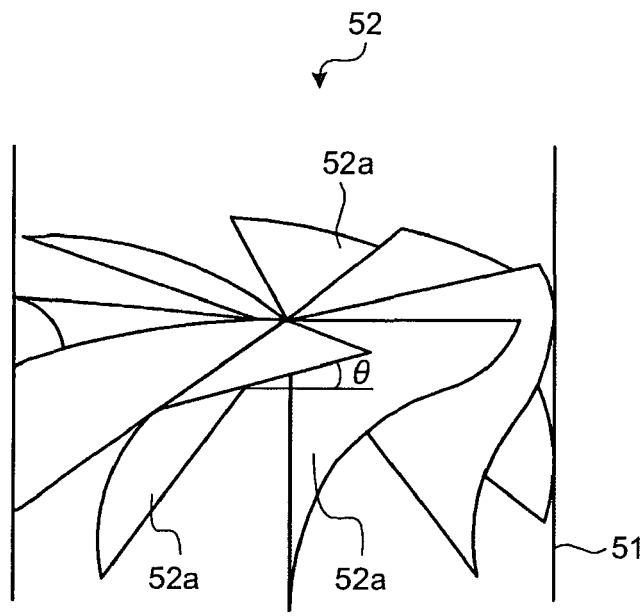
FIG. 8A is a schematic diagram of a swirl vane.
Figure 8B:
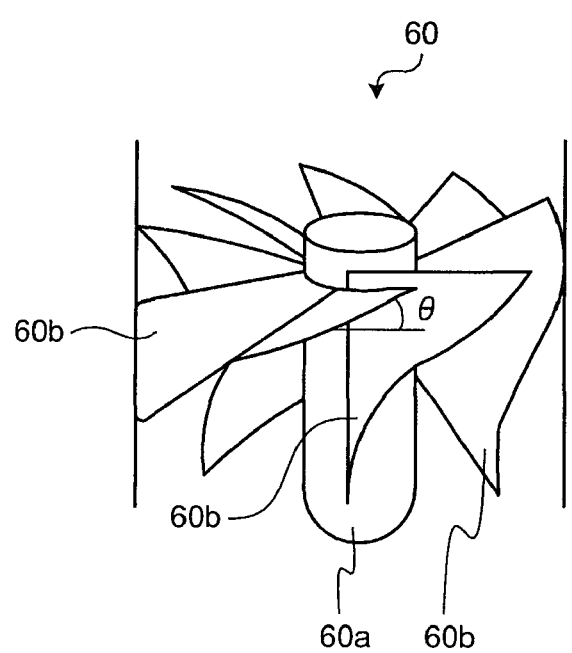
FIG. 8B is a schematic diagram of another swirl vane.
Figure 9:
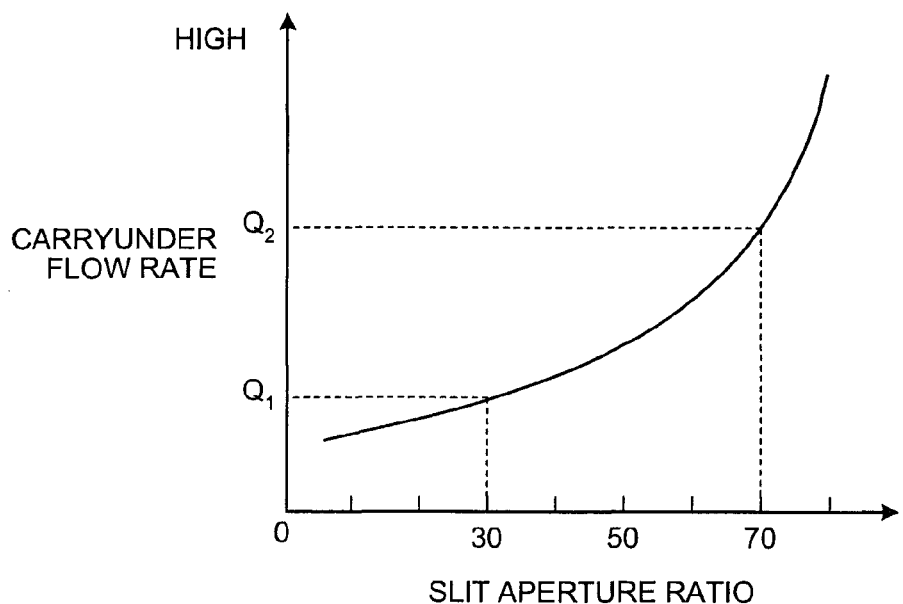
FIG. 9 is a graph of a carryunder flow rate with respect to a slit aperture ratio.
Figure 10:
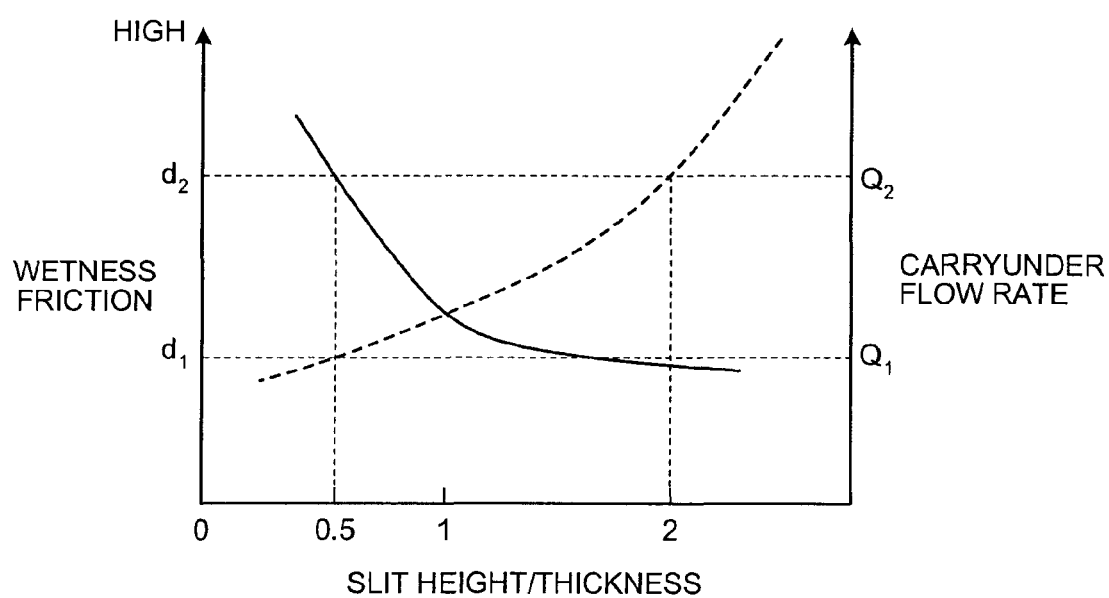
FIG. 10 is a graph of wetness fraction and a carryunder flow rate with respect to a ratio between height and thickness of the slits.
Figure 11:
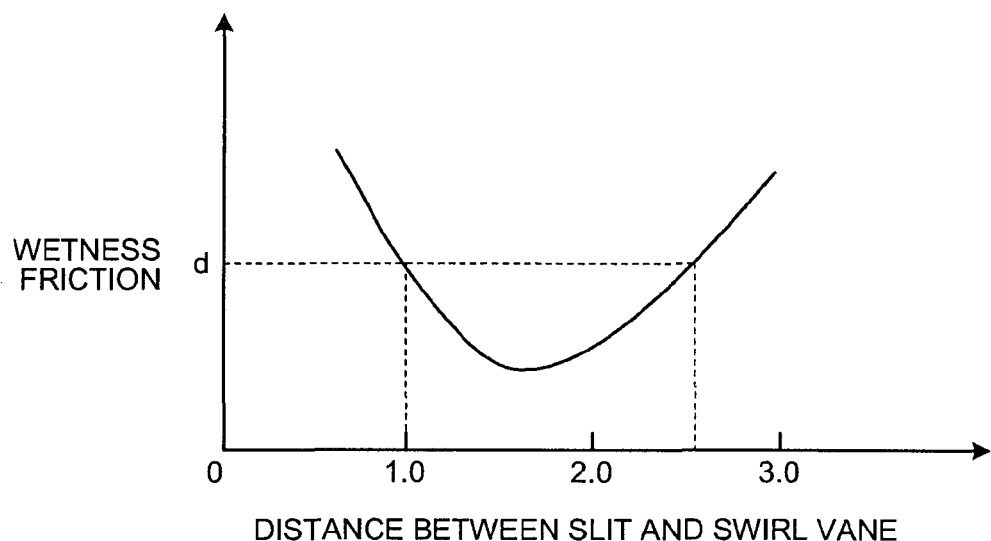
FIG. 11 is a graph of wetness fraction with respect to a distance between the slits and the swirl vane.
Figure 12:
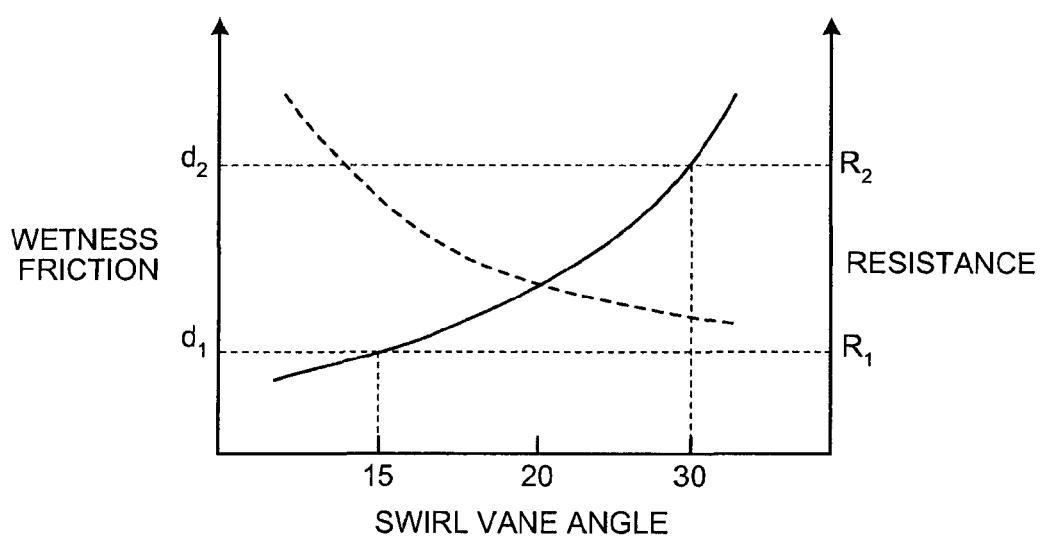
FIG. 12 is a graph of wetness fraction and resistance with respect to a swirl vane angle.
Figure 13:
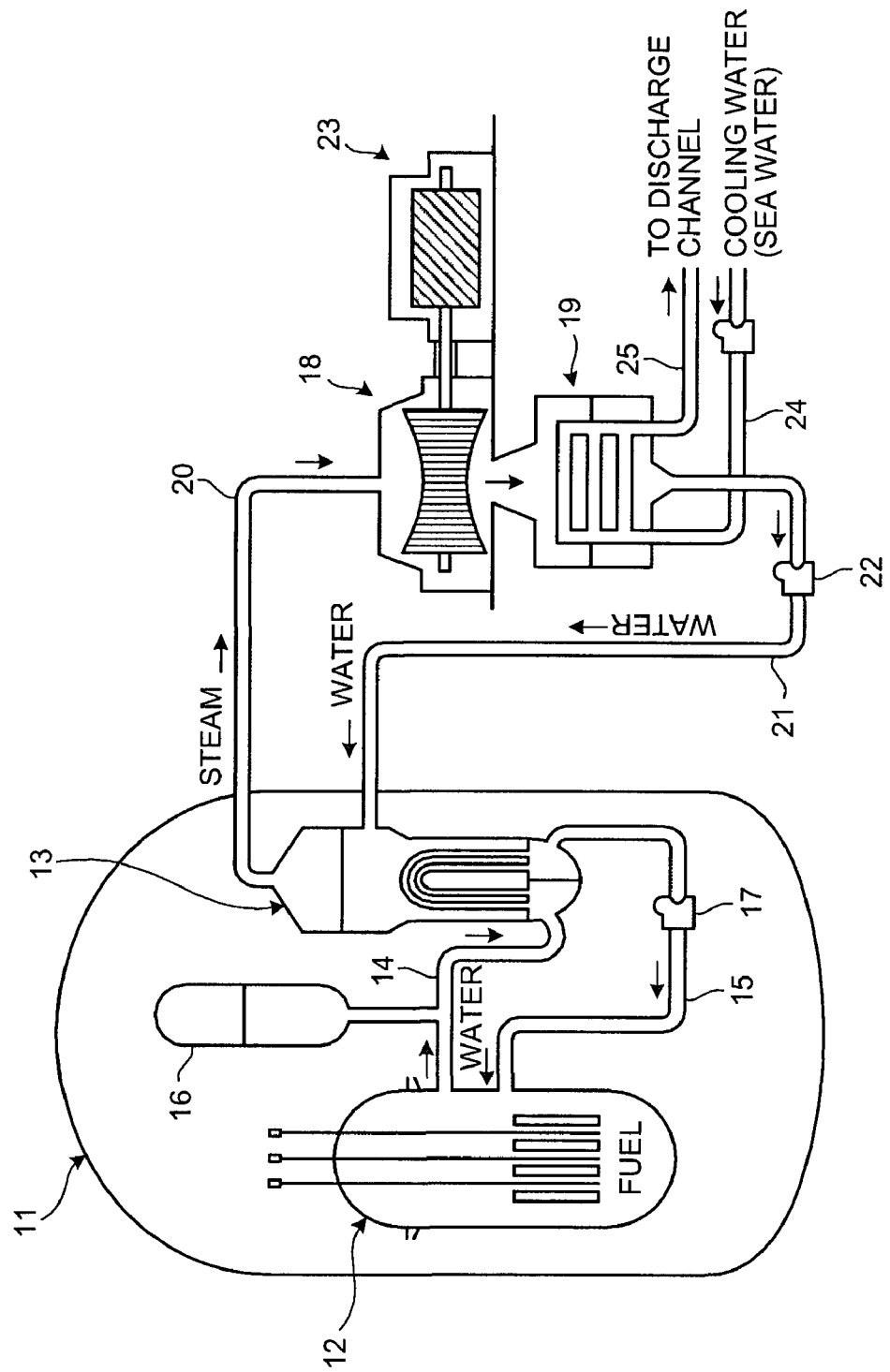
FIG. 13 is a schematic diagram of electric power facilities having a pressurized water reactor to which a steam generator having the steam-water separator according to the embodiment is applied.
Figure 14:
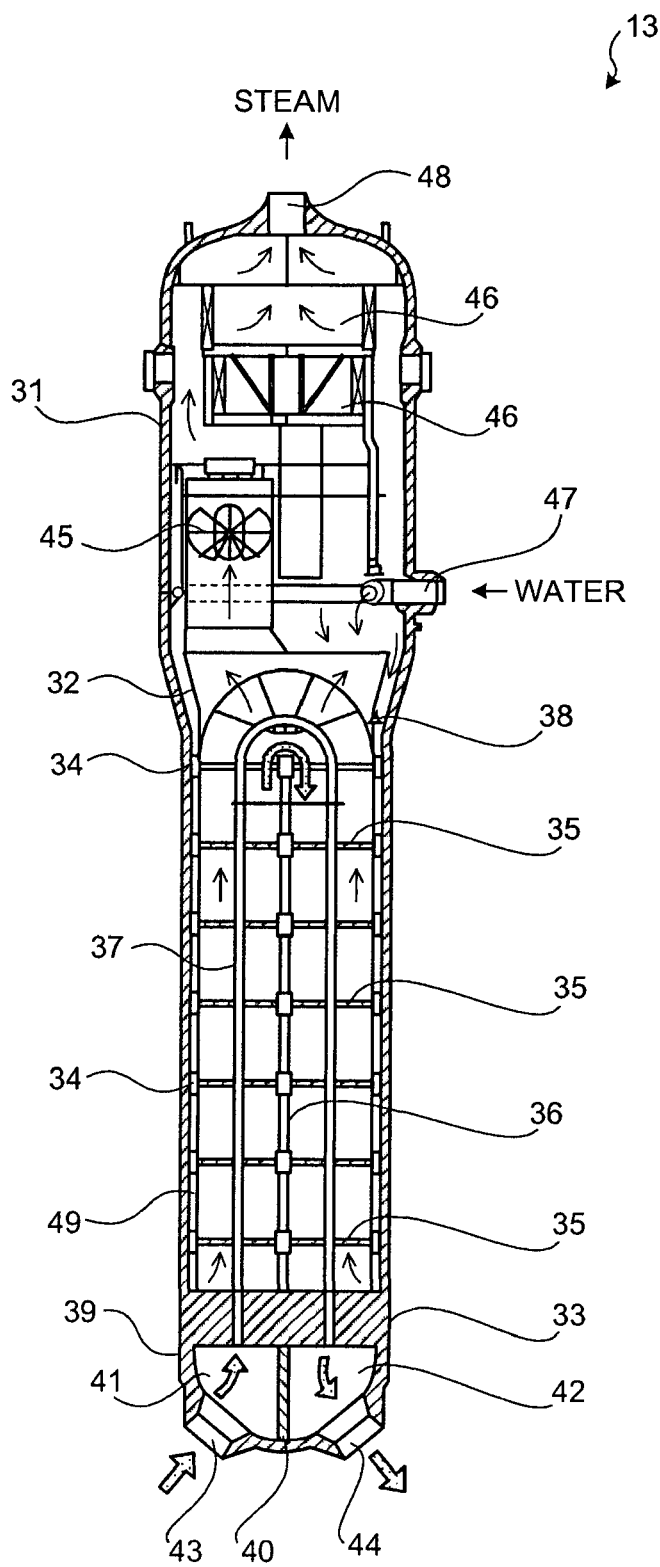
FIG. 14 is a schematic diagram of a steam generator having the steam-water generator according to the embodiment.

FIG. 1 is a schematic diagram of relevant parts of a steam-water separator according to an embodiment of the present invention; FIG. 2 is a partly-broken perspective view of the steam-water separator of the embodiment; FIG. 3 is a plan view of the steam-water separator of the embodiment; FIG. 4 is a schematic diagram of slits formed on a riser; FIG. 5 is a schematic diagram of guide units provided on the riser; FIG. 6 is a plan view of the guide unit; FIG. 7 is a cross section of an upper part of the steam-water separator of the embodiment; FIGS. 8A and 8B are schematic diagrams of a swirl vane; FIG. 9 is a graph of a carryunder flow rate with respect to a slit aperture ratio; FIG. 10 is a graph of wetness fraction and a carryunder flow rate with respect to a ratio between height and thickness of the slits; FIG. 11 is a graph of wetness fraction with respect to a distance between the slits and the swirl vane; FIG. 12 is a graph of wetness fraction and resistance with respect to a swirl vane angle; FIG. 13 is a schematic diagram of electric power facilities having a pressurized reactor to which a steam generator having the steam-water separator of the embodiment is applied; and FIG. 14 is a schematic diagram of a steam generator having the steam-water separator of the embodiment.

The reactor of the present embodiment is the pressurized water reactor (PWR: Pressurized Water Reactor) that, using light water as a reactor coolant and a neutron moderator, runs it as non-boiling, high-temperature and high-pressure water throughout a reactor core, sends the high-temperature and high-pressure water to the steam generator for generation of steam by heat exchange, and sends the steam to a turbine generator for generation of electricity.

Namely, in the electric power facilities having the pressurized water reactor, as shown in FIG. 9, a containment vessel 11 houses a pressurized water reactor 12 and a steam generator 13, the pressurized water reactor 12 and the steam generator 13 are connected by way of cooling water pipes 14 and 15, and the cooling water pipe 14 is provided with a pressurizer 16, and the cooling water pipe 15 is provided with a cooling water pump 17. In this case, the light water is used as moderator and primary cooling water and a primary cooling system is given a high pressure on the order of 150 to 160 atmospheric pressure by the pressurizer 16 to restrain boiling of the primary cooling water at the reactor core. Therefore, in the pressurized water reactor 12, the light water as primary cooling water is heated by low enriched uranium or MOX as fuel, and the light water at high temperature is sent to the steam generator 13 through the cooling water pipe 14 while maintained at predetermined high pressure by the pressurizer 16. At the steam generator 13, heat exchange is made between the light water at high pressure and high temperature and the water as secondary cooling water, and the light water cooled down is sent back to the pressurized water reactor 12 through the cooling water pipe 15.

The steam generator 13 is connected to a turbine 18 and a condenser 19 provided outside the containment vessel 11 by way of cooling water pipes 20 and 21, and the cooling water pipe 21 is provided with a feed pump 22. The turbine 18 is connected to an electric generator 23, and the condenser 19 is connected to a supply pipe 24 and a discharge pipe 25 that supplies and discharges the cooling water (for example, sea water). Therefore, the steam generated by the heat exchange with the high-pressure and high-temperature light water at the steam generator 13 is sent to the turbine 18 through the cooling water pipe 20, and the steam drives the turbine 18, so that the electric generator 23 generates electricity. The steam, after driving the turbine 18, is cooled down by the condenser 19 and then is sent back to the steam generator 13 through the cooling water pipe 21.

In the steam generator 13 in the electric power facilities having the pressurized water reactor, as shown in FIG. 10, a barrel 31 is sealed, has a hollow cylindrical shape, and has a diameter somewhat smaller at the lower part than at the upper part. Inside the barrel 31, a tube bank external cylinder 32 of a cylindrical shape is arranged with a predetermined space from the inner wall of the barrel 31, and its lower end is extended up to the vicinity of a tube plate 33. The tube bank external cylinder 32 is supported by a plurality of supporting members 34 at a position with predetermined distances from the barrel 31 in a longitudinal direction and a circumferential direction.

In the tube bank external cylinder 32, a plurality of tube supporting plates 35 are arranged at the heights corresponding to those of the supporting members 34 and are supported by a plurality of stay-rods 36 extending upward from the tube plate 33. Inside the tube bank external cylinder 32, a plurality of heat-transfer tubes 37 of an inverted U shape are arranged. Each heat-transfer tube 37 has its end expanded and supported by the tube plate 33 and its middle part supported by the plurality of tube supporting plates 35. In this case, the tube supporting plate 35 has a large number of through holes (not shown) formed, and each heat-transfer tube 37 runs through the through hole in a non-contact state.

A water chamber 39 is fixed to the lower end of the barrel 31. The water chamber 39 is divided inside into an incoming chamber 41 and an outgoing chamber 42 by a bulkhead 40, and includes an inlet nozzle 43 and an outlet nozzle 44. Each heat-transfer tube 37 has one end connected to the incoming chamber 41 and the other end connected to the outgoing chamber 42. The cooling water pipe 14 is connected to the inlet nozzle 43, while the cooling water pipe 15 is connected to the outlet nozzle 44.

A steam-water separator 45 that separates supplied water into steam and hot water and a moisture separator 46 that removes moisture from separated steam to bring it to a state close to a dry steam are provided at the upper part of the barrel 31. At the barrel 31, a water supply pipe 47 for supplying the secondary cooling water inside the barrel 31 is inserted between a heat-transfer tube group 38 and the steam-water separator 45, and a steam outlet 48 is formed at the ceiling of the barrel 31. A water supply channel 49 is provided inside the barrel 31, along which the secondary cooling water supplied from the water supply pipe 47 into the barrel 31 flows down between the barrel 31 and the tube bank external cylinder 32, circulates upward at the tube plate 33, and runs upward inside the heat-transfer tube group 38, thereby performing the heat exchange with the hot water (primary cooling water) flowing inside each heat-transfer tube 37. The cooling water pipe 21 is connected to the water supply pipe 47, while the cooling water pipe 20 is connected to the steam outlet 48.

Therefore, the primary cooling water heated by the pressurized water reactor 12 is sent to the incoming chamber 41 of the steam generator 13 through the cooling water pipe 14, circulates through a large number of heat-transfer tubes 47, and flows to the outgoing chamber 42. On the other hand, the secondary cooling water cooled by the condenser 19 is sent to the water supply pipe 47 of the steam generator 13 through the cooling water pipe 21 and runs through the water supply channel 49, performing the heat exchange with the hot water (primary cooling water) flowing in the heat-transfer tubes 47. Namely, inside the barrel 31, the heat exchange is performed between the high-pressure, high-temperature primary cooling water and the secondary cooling water, and the cooled primary cooling water is sent from the outgoing chamber 42 back to the pressurized water reactor 12 through the cooling water pipe 15. On the other hand, the secondary cooling water that has performed the heat exchange with the high-pressure and high-temperature primary cooling water goes upward inside the barrel 31 and is separated by the steam-water separator 45 into the steam and the hot water, and the steam is sent to the turbine 18 through the cooling water pipe 20 after its humidity is removed by the humidity separator 46.

In the steam-water separator 45 of the steam generator 13 thus configured, as shown in FIGS. 1 to 3, a riser 51 as a steam-water riser pipe has a cylindrical shape, enabling the two-phase flow of the steam and the hot water to be introduced at its lower end. A swirl vane 52 capable of giving a swirling force to the two-phase flow is provided in the riser 51. By providing a downcomer barrel 53 as a water downcomer barrel outside the riser 51 to surround the riser 51, an annular downcomer space 54 is formed between the riser 51 and the downcomer barrel 53.

A deck plate 55 is provided above the riser 51 and the downcomer barrel 53 with a predetermined space therefrom. On the deck plate 55, an orifice 56 is formed above and opposite the riser 51, and two vents 57 are formed adjacent to the outer circumference of the orifice 56.

As shown in FIGS. 1 to 4, a plurality of slits 58a, 58b, 58c, and 58d are formed as plural openings on the wall surface of the riser 51 at its upper end above the swirl vane 52. These slits 58a, 58b, 58c, and 58d are each formed over an area having a predetermined angle a equally spaced in a circumferential direction, and each slit includes plural openings arranged in parallel vertically along the riser 51. Therefore, when a liquid film of the water separated from the two-phase flow goes up to the upper end of the riser 51, the water comes to flow into the downcomer space 54 formed between the riser 51 and the downcomer barrel 53 through the slits 58a, 58b, 58c, and 58d.

Two guide units 59 that discharge swirling flows of the steam are provided on the wall surface of the downcomer barrel 53 at the upper end, equally spaced in a circumferential direction. As shown in FIGS. 3 and 5 to 7, the guide unit 59 is configured by forming a notch 59a on part of the wall surface of the downcomer barrel 53 at the upper end and fixing a wall surface 59b along a direction of the tangent line of the downcomer barrel 53 and a bottom surface 59c, to the notch 59a. The guide units 59 are provided opposite the two slits 58a and 58c among the four slits 58a, 58b, 58c, and 58d. Introducing units 57a of the vents 57 are provided downstream of the swirling flows of the steam discharged from the two guide units 59.

Therefore, some of the steam separated from the two-phase flow passes through a space between the upper end of the riser 51 and the deck plate 55, moves outward from the downcomer barrel 53 while being guided by the two guide units 59, and is discharged through the corresponding vents 57 above the deck plate 55, which prevents the water from being lifted up by the steam. Some of the water separated from the two-phase flow moves out of the downcomer barrel 53 while being guided by the guide units 59 and falls down, which facilitates separation of the water and the steam.

As shown in FIG. 8A, the swirl vane 52 has a plurality of blades 52a (eight blades in this embodiment) arranged in the form of a ring. Outer peripheries of the blades 52a are fixed to an inner circumferential surface of the riser 51, respectively, and no hub is provided. Accordingly, a swirling force can be applied to the two-phase flow going upward inside the riser 51 from its lower end. As shown in FIG. 8B, a swirl vane 60 having a hub 60a around which a plurality of blades 60b are arranged in the form of a ring can be alternatively provided.

A restraint plate 61 having a doughnut shape, horizontally projecting toward the downcomer barrel 53 to restrict carryunder, is fixed to the lower part of the riser 51, as shown in FIG. 1. Accordingly, when the water separated from the two-phase flow goes up to the upper end of the riser 51, the water flows out of the riser 51 into the downcomer space 54, and at this time, the restraint plate 61 restrains carryunder outward from the downcomer barrel 53.

The steam-water separator according to the embodiment is optimized in shape to appropriately separate the two-phase flow into the water and the steam.

First, as shown in FIG. 1, aperture ratios of the slits 58a, 58b, 58c, and 58d formed on the riser 51 are set at from 30% to 70%, preferably at about 50%. That is, the aperture ratios of the slits 58a, 58b, 58c, and 58d with respect to areas h1 on the riser 51, in which the slits 58a, 58b, 58c, and 58d are formed, are 30% to 70%. In this case, if the aperture ratios of the slits 58a, 58b, 58c, and 58d are lower than 30%, the liquid film going upward along the inner circumferential surface of the riser 51 cannot appropriately flow into the downcomer space 54 through the slits 58a, 58b, 58c, and 58d. If the aperture ratios of the slits 58a, 58b, 58c, and 58d exceed 70%, the separated steam is discharged through the slits 58a, 58b, 58c, and 58d into the downcomer space 54. That is, as shown in FIG. 9, when the aperture ratios of the slits 58a, 58b, 58c, and 58d are set at from 30% to 70%, a carryunder flow rate (in this case, a rate of flow going down into the downcomer space 54) can be kept at proper values from $Q_1$ to $Q_2$, which restrains carryover upward from the orifice 56 and carryunder outward from the downcomer barrel 53.

Secondly, heights hg of the slits 58a, 58b, 58c, and 58d formed on the riser 51 are set at from half to twice, preferably at about one time the thickness d of the riser 51. In this case, if the heights hg of the slits 58a, 58b, 58c, and 58d are smaller than half the thickness d of the riser 51, the liquid film going upward along the inner circumferential surface of the riser 51 is discharged poorly through the slits 58a, 58b, 58c, and 58d. If the heights hg of the slits 58a, 58b, 58c, and 58d are larger than twice the thickness d of the riser 51, the separated steam is discharged through the slits 58a, 58b, 58c, and 58d into the downcomer space 54. That is, as shown in FIG. 10, when the heights hg of the slits 58a, 58b, 58c, and 58d are sets at from half to twice the thickness d of the riser 51, wetness fraction of the steam discharged from the orifice 56 can be kept at proper values from $d_1$ to $d_2$, and the carryunder flow rate can be kept at proper values from $Q_1$ to $Q_2$.

A distance $h_2$ from the slits 58a, 58b, 58c, and 58d formed on the riser 51 to the swirl vane 52 is set from one time to 2.5 times, and preferably at about 1.6 times an internal diameter Dri of the riser 51. In this case, if the distance $h_2$ from the slits 58a, 58b, 58c, and 58d to the swirl vane 52 is shorter than one time the internal diameter Dri of the riser 51, the steam cannot be sufficiently separated from the two-phase flow at the locations of the slits 58a, 58b, 58c, and 58d. If the distance $h_2$ from the slits 58a, 58b, 58c, and 58d to the swirl vane 52 is longer than 2.5 times the internal diameter Dri of the riser 51, the separated steam is discharged through the slits 58a, 58b, 58c, and 58d into the downcomer space 54. That is, as shown in FIG. 11, when the distance $h_2$ from the slits 58a, 58b, 58c, and 58d to the swirl vane 52 is set at from one time to 2.5 times the internal diameter Dri of the riser 51, the wetness fraction of the steam discharged from the orifice 56 can be kept at values equal to or lower than an appropriate value d.

In addition, a twist angle θ of the swirl vane 52 is set at from 15 degrees to 30 degrees, and preferably at about 20 degrees. In this case, if the twist angle θ of the swirl vane 52 is smaller than 15 degrees, no swirl is generated so that the two-phase flow cannot be reliably separated into the steam and the water. If the twisting angle θ of the swirl vane 52 is larger than 30 degrees, the swirl vane 52 becomes a resistance to the two-phase flow, resulting in pressure loss. In the case of the swirl vane 60 having a hub, the twist angle θ is set at from 20 degrees to 30 degrees, and preferably at about 25 degrees. That is, as shown in FIG. 12, when the twist angle θ of the swirl vane 52 is set at from 15 degrees to 30 degrees, the wetness fraction of the steam discharged from the orifice 56 can be kept at appropriate values from $d_1$ to $d_2$, and resistance to the two-phase flow going upward inside the riser 51 can be kept at appropriate values from $R_1$ to $R_2$.

A ratio of the internal diameter Doi of the orifice 56 with respect to the internal diameter Dri of the riser 51 is set at from 0.7 to 0.9. In this case, if the ratio of the internal diameter Doi of the orifice 56 with respect to the internal diameter Dri of the riser 51 is lower than 0.7, resistance in the orifice 56 becomes too large to properly discharge the steam from the orifice 56, resulting in deteriorated separating efficiency. If the ratio of the internal diameter Doi of the orifice 56 with respect to the internal diameter Dri of the riser 51 is higher than 0.9, there is no resistance in the orifice 56, producing a so-called carryover phenomenon that the liquid film is discharged from the orifice 56.

A ratio of a spatial height hrg from the riser 51 to the deck plate 55 with respect to the internal diameter Dri of the riser 51 is set at from 0.05 to 0.3. In this case, if the ratio of the spatial height hrg from the riser 51 to the deck plate 55 with respect to the internal diameter Dri of the riser 51 is lower than 0.05, resistance in a space between the riser 51 and the deck plate 55 becomes large, which prevents the water from being properly discharged into the downcomer space 54 so that a so-called carryunder phenomenon that the water flows out of the downcomer barrel 53 occurs. If the ratio of the spatial height hrg from the riser 51 to the deck plate 55 with respect to the internal diameter Dri of the riser 51 is higher than 0.3, a large amount of steam is discharged through a space between the riser 51 and the deck plate 55, resulting in a deteriorated separating efficiency.

A ratio between an upward projection height $Hor_1$ and a downward projection height $Hor_2$ of the orifice 56 relative to the deck plate 55 is set at from 2:1 to 4:1, and a ratio between the upward projection height $Hor_1$ and the internal diameter Doi of the orifice 56 is set at from 1:2 to 1:3. In this case, if the upward projection height $Hor_1$ of the orifice 56 is smaller or the internal diameter Doi of the orifice 56 is smaller, the carryover phenomenon is prone to occur.

The operation of the steam-water separator 45 of the present embodiment configured as described above is explained.

The two-phase flow of the steam and the hot water is introduced into the riser 51 from its lower part, flows upward by a swirling force by the swirl vane 52, and is separated into the liquid whose primary element is the hot water and the liquid whose primary element is the steam due to a difference in the whirling radius depending on a difference in mass. The low-mass liquid whose primary element is the steam flows upward inside the riser 51 while whirling with a small whirling radius centered near the central axis of the riser 51, and is discharged above the deck plate 55 through the orifice 56 and the vents 57. On the other hand, the high-mass liquid whose primary element is the hot water flows upward inside the riser 51 while whirling with a whirling radius larger than that of the liquid whose primary element is the steam, and is introduced into the downcomer space 54 of the downcomer barrel 53 through an opening between the riser 51 and the deck plate 60 and falls down the downcomer space 54.

At this moment, the two-phase flow of the steam and the hot water is separated into the steam and the water by the whirling power of the swirl vane 52, and the water flows upward as the liquid film along the inner surface of the riser 51. However, because the slits 58a, 58b, 58c, and 58d are formed at the upper end of the riser 51, some of the liquid film flow is discharged outside through the slits 58a, 58b, 58c, and 58d. Therefore, the hot water appropriately flows into the downcomer space 54 of the downcomer barrel 53 and flows down therein without being carried over from the orifice 56. On the other hand, the steam flows upward while whirling at the upper part of the riser 51 and is appropriately discharged above the deck plate 55 through the orifice 56 without absorbing any water because these is no carryover of the hot water.

Above the riser 51, some of the steam separated from the two-phase flow passes through a space between the upper end of the riser 51 and the deck plate 55, moves outward from the downcomer barrel 53 while being guided by the guide units 59, and is discharged above the deck plate 55 through the vents 57. Thus, the steam is efficiently guided to the vents 57 and is isolated from the water surface by the guide units 59, so that it is possible to prevent the water from being lifted up by the steam, which enhances the steam-water separating efficiency. Some of the water separated from the two-phase flow moves outward from the downcomer barrel 53 while being guided by the guide units 59 and flows down, which facilitates separation of the water from the steam.

As above, in the steam-water separator according to the embodiment, the swirl vane 52 is provided inside the riser 51, the annular downcomer space 54 is formed by providing the downcomer barrel 53 outside the riser 51, the deck plate 55 is arranged above the riser 51 and the downcomer barrel 53 with a predetermined space therefrom, to form the orifice 56 and the vents 57, and the aperture ratios of the plural slits 58a, 58b, 58c, and 58d formed on the riser 51 are set at from 30% to 70%.

Therefore, the two-phase flow of the water and the steam introduced into the riser 51 from its lower end, moving upward, and is lifted while being swirled by the swirl vane 52, and the water flows upward while depositing on the inner surface of the riser 51 to form a liquid film flow. Because the aperture ratios of the slits 58a, 58b, 58c, and 58d are set at from 30% to 70%, the water appropriately flows into the downcomer space 54 and falls down without carried over from the orifice 56 or carried under toward the outside of the downcomer barrel 53. On the other hand, the steam flows upward while swirling at the upper part of the riser 51 and is appropriately discharged above the deck plate 55 through the orifice 56 without gulfing the water. Consequently, the steam-water separating efficiency is enhanced.

In the present embodiment, each of the plural slits 58a, 58b, 58c, and 58d formed on the riser 51 includes plural horizontal slits that are arranged in parallel along the vertical direction, and the heights hg of these slits are set at from half to twice the thickness d of the riser 51. Accordingly, it is possible to prevent the steam from flowing into the slits 58a, 58b, 58c, and 58d, and only the water can appropriately flow into the downcomer space 54 through the slits 58a, 58b, 58c, and 58d.

The distance $h_2$ from the plural slits 58a, 58b, 58c, and 58d formed on the riser 51 to the swirl vane 52 is set at from 1 time to 2.5 times the internal diameter of the riser 51. Accordingly, after the two-phase flow of the water and the steam is lifted while being swirled by the swirl vane 52, thereby being appropriately separated into the water and the steam, the water appropriately flows into the downcomer space 54 while the steam is appropriately discharged through the orifice 56, resulting in an enhanced steam-water separating efficiency.

The two guide units 59 that discharge swirling flows of the steam are provided on the wall surface of the downcomer barrel 53 at the upper end, equally spaced in the circumferential direction. Two slits 58a and 58c among the four slits 58a, 58b, 58c, and 58d formed on the riser 51 are located opposite the guide units 59, and the vents 57 are provided downstream of the swirling flows of the steam discharged from the guide units 59.

Therefore, the water lifted and swirled by the swirl vane 52 and thus separated passes through the slits 58a, 58b, 58c, and 58d, and flows out of the downcomer barrel 53 together with the steam through the guide units 59. The steam discharged out of the downcomer barrel 53 through the guide units 59 is appropriately discharged from the vents 57 above the deck plate 55. Thus, the discharging process can be achieved while the water and the steam is appropriately separated.

The twist angle θ of the swirl vane 52 is set at from 15 degrees to 30 degrees. By applying an appropriate swirling force to the two-phase flow by the swirl vane 52, the two-phase flow can be reliably separated into the water and the steam.

Because the ratio of the internal diameter Doi of the orifice 56 with respect to the internal diameter Dri of the riser 51 is set at from 0.7 to 0.9, only the steam can be appropriately discharged through the orifice 56 above the deck plate 55 without the separated water being carried over from the orifice 56.

Because the ratio of the spatial height hrg from the riser 51 to the deck plate 55 with respect to the internal diameter Dri of the riser 51 is set at from 0.05 to 0.3, the separated water is not carried over from the orifice 56, and the discharge of the steam from the space is restrained, so that the water can appropriately flow into the downcomer space 54.

INDUSTRIAL APPLICABILITY

The steam-water separator according to the present invention enhances the steam-water separating efficiency by appropriately separating the steam and the water to reliably discharge the separated steam upward from the orifice while ensuring the separated water to fall down through the downcomer space. Accordingly, this steam-water separator can be applied to any kind of steam-water separator.

The invention claimed is:

1. A steam-water separator comprising:
a steam-water riser pipe that includes a plurality of openings on a wall surface at an upper end thereof and through which a two-phase flow of water and steam goes up;
a swirl vane provided inside the steam-water riser pipe;
a downcomer barrel which is disposed around the steam-water riser pipe to form an annular downcomer space; and
a deck plate which is disposed on upper ends of the steam-water riser pipe and the downcomer barrel with a predetermined space therefrom such that the deck plate faces to the steam-water riser pipe and the downcomer barrel, the deck plate including an orifice arranged above the steam-water riser pipe, wherein
an aperture ratio of the plural openings formed on the steam-water riser pipe is set at from 30% to 70%.

2. The steam-water separator according to claim 1, wherein the plurality of openings formed on the steam-water riser pipe includes a plurality of horizontal slits arranged in parallel along a vertical direction, and a height of each of the slits is set at from half to twice a thickness of the steam-water riser pipe.

3. The steam-water separator according to claim 1, wherein a distance between the plurality of openings formed on the steam-water riser pipe and the swirl vane is set at from 1 to 2.5 times an internal diameter of the steam-water riser pipe.

4. The steam-water separator according to claim 1, wherein two guide units that discharge swirling flow of the steam are provided on a wall surface at an upper end of the downcomer barrel, the guide units are equally spaced in a circumferential direction thereof, and four openings are provided on the steam-water riser pipe with equally spaced in a circumferential direction of the steam-water riser pipe, and two of the four openings are located opposite the guide units.

5. The steam-water separator according to claim 4, wherein vents are provided on the deck plate downstream of the swirling flow of the steam discharged from the guide units.

6. The steam-water separator according to claim 1, wherein a twist angle of the swirl vane is set at from 15 degrees to 30 degrees.

7. The steam-water separator according to claim 1, wherein a ratio of an internal diameter of the orifice with respect to an internal diameter of the steam-water riser pipe is set at from 0.7 to 0.9.

8. The steam-water separator according to claim 1, wherein a ratio of a spatial height from the steam-water riser pipe to the deck plate with respect to an internal diameter of the steam-water riser pipe is set at from 0.05 to 0.3.

9. The steam-water separator according to claim 1, wherein a ratio between an upward projection height and a downward projection height of the orifice relative to the deck plate is set at from 2:1 to 4:1, and a ratio between the upward projection height and an internal diameter of the orifice is set at from 1:2 to 1:3.

* * * * *